INVENTOR
HAROLD T. ATWOOD
BY Benjamin Schlosser
ATTORNEY

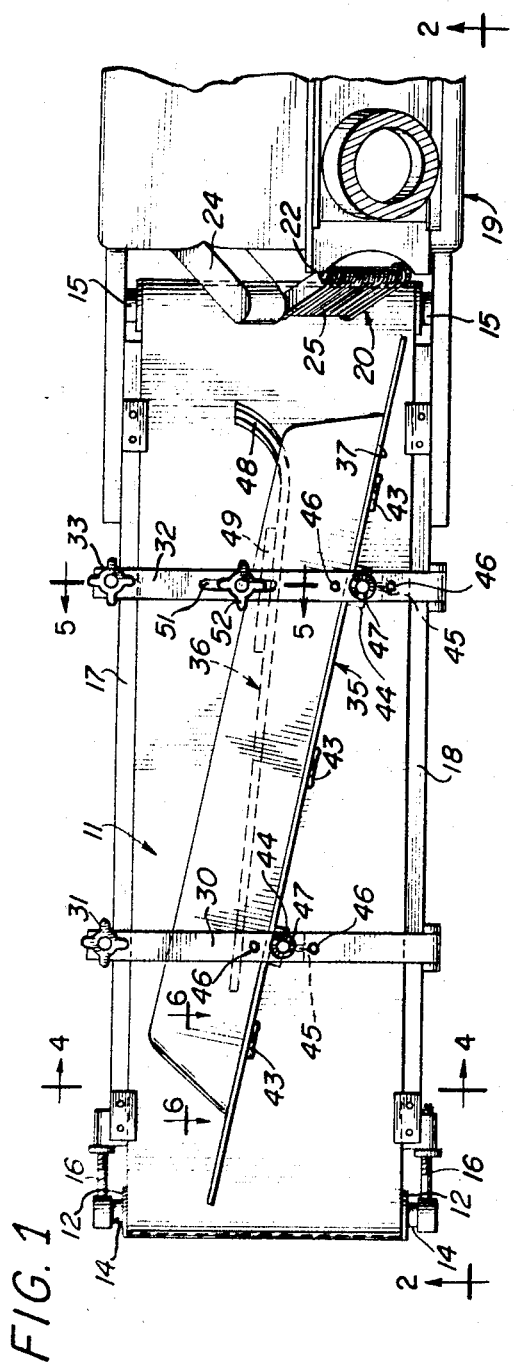

United States Patent Office 3,448,697
Patented June 10, 1969

3,448,697
ROUNDING APPARATUS FOR DOUGH
Harold T. Atwood, Chicago, Ill.
(14152 Irving Ave., Dolton, Ill. 60419)
Filed Dec. 21, 1966, Ser. No. 603,591
Int. Cl. A21c 3/00
U.S. Cl. 107—9                                                    7 Claims

ABSTRACT OF THE DISCLOSURE

A guide member of inverted L-shape and a compression bar are adjustably mounted above an endless conveyor belt and cooperate with the conveyor belt to shape individual pieces of dough of uniform weight and nonuniform shape into balls of uniform size and texture so that they may be frozen and stored conveniently until used. The guide member and the compression bar may be adjusted to round individual pieces of dough of any uniform weight within a range of from about one half ounce to about twenty eight ounces. The surfaces of the guide member and the compression bar are coated with polytetrafluoroethylene to prevent the dough from sticking to either of them as the conveyor belt carries it to the discharge end of the apparatus. The underside of the horizontal leg of the guide member is tapered upwardly at its discharge end to allow the ball to expand uniformly as the conveyor belt carries it past the end of the guide member.

---

The present invention relates to an apparatus adapted to receive individual pieces of dough of uniform weight but of nonuniform shape and to roll them into balls of uniform size and texture rapidly at closely spaced intervals so that they can be frozen and conveniently stored until withdrawn for use.

A dough dividing machine of the type described in the application Ser. No. 403,484, now Patent No. 3,311,068 filed by Harold T. Atwood and Walter Jaeger as joint inventors on Oct. 13, 1964, is adapted to divide a mass of dough into individual pieces of uniform weight within a range of from about one half ounce to about twenty eight ounces and deposit them on a conveyor belt in rapid succession.

In accordance with the present invention, a guide member is angled along the top surface of the conveyor belt so that the individual pieces of dough are continuously forced against one surface of the guide member as they are carried by the conveyor belt toward the discharge end of the apparatus. As each piece of dough is forced into engagement with the guide member by the continuously driven conveyor belt it bounces away from the guide member, and it repeatedly moves into and out of engagement with the guide member as it is carried along by the conveyor belt.

A compression bar adjustably mounted above the upper surface of the conveyor belt is inclined toward the discharge end of the guide member so that it restricts the movement of the dough away from the guide member. The inside surface of the guide member is curved to help shape the individual pieces of dough into balls as they engage said surface. The surfaces of the guide member and compression bar that engage the dough are preferably coated with polytetrafluoroethylene to prevent sticking. The conveyor belt may also be coated with polytetrafluoroethylene. As the dough moves toward the discharge end of the apparatus its movement away from the guide member diminishes rapidly and it is held continuously in engagement with the guide member and the compression bar for a short distance before it is carried past the end of the compression bar. In this area the underside of the horizontal leg of the guide member is tapered upwardly so that as the ball of dough expands laterally upon release from the confinement of the compression bar it may also expand gradually in its vertical dimension to insure uniform texture of the dough in the final ball shape.

Suitable structure by means of which the above mentioned and other advantages of the invention are attained will be fully described in the following specification, taken in conjunction with the accompanying drawings showing a preferred illustrative embodiment of the invention, in which:

FIG. 1 is a top elevational view of the rounding apparatus embodying the invention, with parts of a dough dividing machine disposed adjacent the feed end of the rounding apparatus;

FIG. 2 is a side elevational view of the apparatus shown in FIG. 1, in the plane indicated by the line 2—2 of FIG. 1 and looking in the direction of the arrows;

Figure 3:
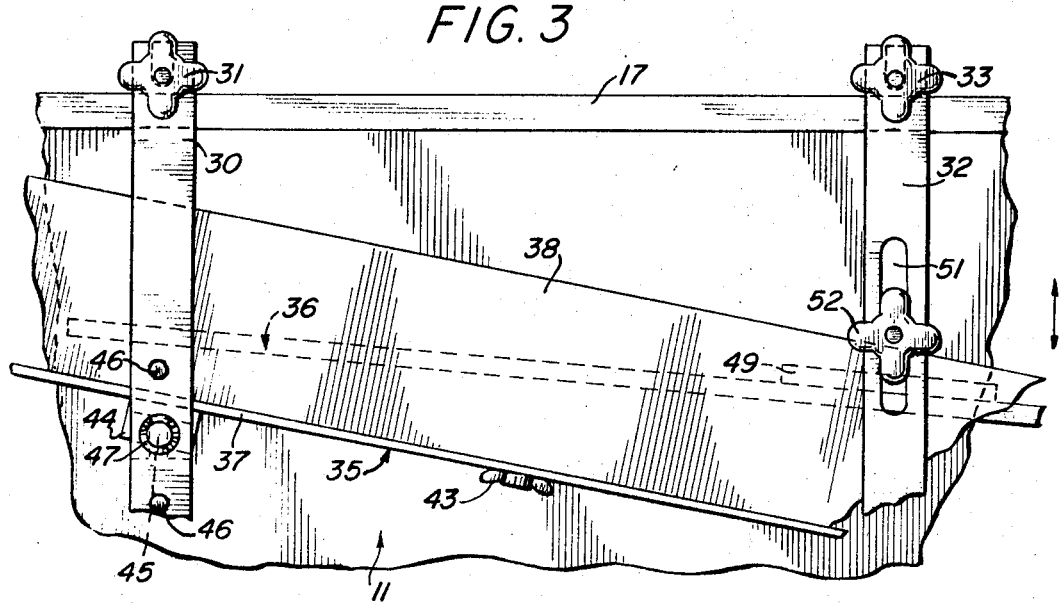
FIG. 3 is an enlarged fragmentary top elevational view showing the means for adjusting the guide member and compression bar.
Figure 4:
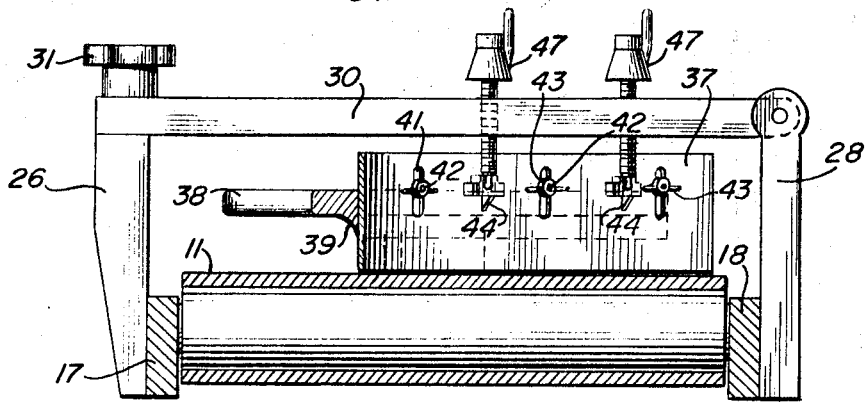
FIG. 4 is an enlarged cross sectional view, taken in the plane indicated by the line 4—4 of FIG. 1.
Figure 5:
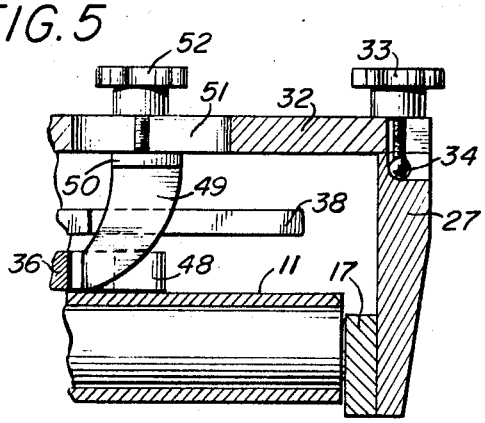
FIG. 5 is an enlarged cross sectional view, taken in the plane indicated by the line 5—5 in FIG. 1.

Referring to the drawings, an endless conveyor belt 11 extends around two rolls 12 and 13 mounted on parallel shafts 14 and 15, respectively. Either one of the shafts is driven by any conventional drive mechanism (not shown). Tensioning means 16 are mounted adjacent opposite ends of the shaft 14 to hold the belt 11 under suitable tension and to facilitate replacement of the belt when necessary. Longiudinal rails 17 and 18 are mounted adjacent opposite edges of the belt 11. The feed end of the belt 11 is located adjacent the discharge end of a dough divider 19.

The individual pieces of dough discharged from the dough divider would normally drop on the feed end of the belt 11, but I prefer to provide a conveyor 20 between the dough divider and the belt 11 to prevent the possibility that some scraps of dough may not feed properly and may accumulate to interfere with the operation. The conveyor 20 is inclined between the discharge end of the dough divider and the belt 11, with the lower end of the conveyor positioned directly above the belt. The conveyor 20 comprises a pair of rolls 21 and 22 rotatably mounted adjacent opposite ends of a frame 23. The lower roll 21 is rotated by a drive mechanism 24. A plurality of endless cords 25, of polyurethane or other suitable material, extending around the rolls 21 and 22 are spaced so closely that scraps of dough will not fall therebetween.

The two upright posts 26 and 27 of equal height are secured at their lower ends to the rail 17 in longitudinally spaced relationship to the rail. Two other upright posts 28 and 29 are secured at their lower ends to the rail 18. The posts 26 and 28 are aligned transversely of the belt 11 and the posts 27 and 29 are also aligned transversely of the belt. A cross bar 30 hinged at one end to the upper end of the post 28 is adapted to extend transversely above the belt 11 with its other end seated on top of the post 26. A latch 31 pivotally mounted in the upper end of the post 26 is adapted to swing over the top of the cross bar 30 and latch it in parallel relationship to the belt 11. A cross bar 32 hinged to the upper end of the post 29 is substantially similar to the cross bar 30 and is latched in place by a latch 33 pivotally mounted in the upper end of the post 27, as indicated at 34.

The individual pieces of dough discharged from the dough divider are of uniform weight, from one-half ounce to twenty eight ounces, depending upon the adjustment of the dough divider, but are not of uniform shape as they are deposited on the conveyor belt 11. A guide member 35 and a compression bar 36 mounted above the belt 11 simultaneously engage the individual pieces of dough for a portion of its travel and to shape them into balls of uniform size and texture as they are carried by the belt 11 from its feed end to its discharge end. Means for adjusting the spatial relationship between the guide member, the compression bar and the belt, whereby the apparatus is enabled to work with various sizes of dough pieces, are hereinafter described.

Figure 6:
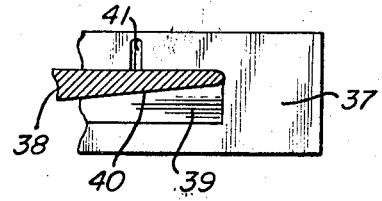
FIG. 6 is a fragmentary sectional view, taken along the line 6—6 of FIG. 1.

The guide member 35 comprises a vertically disposed plate 37 and a substantially horizontal plate 38 secured thereto in a manner hereinafter described to form a guide member of substantially inverted L-shape. The longitudinal edge portion of the plate 38 adjacent the plate 37 is curved downwardly, as indicated at 39, to merge with the vertical surface of the plate 37. The underside of the horizontal portion of the plate 38 is gradually tapered upwardly adjacent its discharge end, as indicated at 40 in FIG. 6, for a reason hereinafter disclosed. The plate 37 has a plurality of vertically disposed slots 41, and the edge of the plate 38 adjacent thereto has a plurality of screws 42 extending outwardly therefrom and spaced to fit in the slots 41. Nuts 43 threaded on the screws 42 are tightened against the plate 37 to hold the plate 38 with the flat surfaces of the plate 38 parallel to the belt 11 at any desired distance above the belt, depending upon the size of the individual pieces of dough to be rounded.

The plate 37 is positioned at any desired angle longitudinally of the belt 11 with its lower edge closely adjacent the upper surface of the belt. Two lugs 44 secured to the back side of the plate 37 are each provided with an undercut groove 45 extending inwardly from its outer edge. Each cross bar 30 and 32 is provided with a series of apertures 46, and a screw 47 adapted to extend through any of the apertures has a ball (not shown) on its lower end adapted to fit into the groove 45. Each screw 47 is positioned in the selected aperture 46, and the balls are then entered into the grooves 45 to adjust the angularity of the guide member with respect to the belt 11. The screws 47 may then be turned in either direction to raise or lower the guide member to provide an accurate vertical adjustment.

The compression bar 36 is substantially straight throughout most of its length, but adjacent the feed end of the belt 11 it is curved outwardly from the plate 37, as indicated at 48, to provide a wide feeding zone for the pieces of dough discharged from the conveyor 20. The bar 36 is adapted to fit under the horizontal leg 38 of the guide member and may be arranged at any desired angle relative to the plate 37. A bracket 49 secured to the compression bar 36 curves upwardly and has a flat section 50 adapted to fit under the cross bar 32. The cross bar 32 has a slot 51, and a screw 52 extends through the slot 51 to engage the section 50 of the bracket 49. The bar 36 may be adjusted both laterally and pivotally relative to the guide member 35 and is then secured in its adjusted position by tightening the screw 52 against the cross bar 32.

As the pieces of dough are moved by the belt 11, the angularity of the guide member 35 causes them to engage the plate 37 and to roll along, bouncing away from the plate 37 and being carried back into engagement with it by the belt 11. The angularity of the compression bar gradually decreases the distance the dough can bounce away from the plate 37. As the dough approaches the discharge end of the guide member it is pushed against the plate 37 and the curved surface 39 by the compression bar. The surfaces of the guide member and the compression bar which engage the dough are provided with a thin coating of polytetrafluoroethylene to prevent the dough from sticking.

The dough is compressed into ball shape as it approaches the discharge end of the belt 11. The gradual upward taper 40 allows the ball of dough to expand uniformly immediately after it passes the discharge end of the compression bar, and thus insures the uniform texture of the dough in each ball as it is discharged from the conveyor belt 11.

I claim:
1. A rounding apparatus for shaping a piece of dough of irregular shape into a rounded ball of substantially uniform texture, said apparatus comprising a conveyor belt for moving said piece of dough along a longitudinal path, a guide member of inverted L-shape positioned immediately above said belt and extending diagonally of said belt in a generally longitudinal direction, said guide member comprising a vertically disposed plate and a substantially horizontal plate secured thereto, a compression bar positioned immediately above said belt and fitting under said substantially horizontal plate in longitudinally converging laterally spaced relationship to said vertically disposed plate, and means for adjusting said compression bar laterally of said guide member, whereby said guide member and said compression bar simultaneously engage said piece of dough for a portion of its travel as it is moved by said conveyor belt and cooperate with said belt to round it into ball shape.

2. An apparatus as recited in claim 1, including means for adjustably securing said horizontal plate to said vertically disposed plate.

3. An apparatus as recited in claim 2, in which the longitudinal edge portion of said horizontal plate adjacent said vertically disposed plate is curved downwardly to merge with the adjacent vertical surface, and the surfaces of said guide member and said compression member adapted to engage said dough are provided with a coating of polytetrafluoroethylene.

4. An apparatus as recited in claim 1, including means for adjusting said compression bar laterally and pivotally about a vertical axis.

5. An apparatus as recited in claim 1, in which the discharge end of said guide member extends beyond the discharge end of said compression bar, and the underside of said horizontal plate is tapered upwardly adjacent its discharge end.

6. An apparatus as recited in claim 1 and including a pair of cross bars extending transversely of said conveyor belt in a plane above said belt, and means extending through said cross bars into engagement with said guide member to support in vertically adjustable positions.

7. An apparatus as recited in claim 6, in which each of said cross bars has a threaded aperture and said last mentioned means comprises a screw threaded through each of said apertures, each of said screws being rotatable to adjust the vertical position of said guide member relative to said conveyor belt.

References Cited

UNITED STATES PATENTS

| 936,661 | 10/1909 | Petri | 107—9.1 |
| 2,858,775 | 11/1958 | Marasso | 107—15.5 |
| 3,274,959 | 9/1966 | Jimenez et al. | 107—9 XR |

FOREIGN PATENTS

| 20,109 | 9/1908 | Great Britain. |
| 331,193 | 10/1935 | Italy. |

WALTER A. SCHEEL, Primary Examiner.

ARTHUR O. HENDERSON, Assistant Examiner.